(12) United States Patent
Keeth (10) Patent No.: US 6,229,381 B1
(45) Date of Patent: May 8, 2001

(54) TWO-STAGE VOLTAGE PUMP

(75) Inventor: Brent Keeth, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/385,106

(22) Filed: Aug. 27, 1999

(51) Int. Cl.$^7$ ................................ G05F 1/10; G05F 3/20
(52) U.S. Cl. ..................................... 327/536; 365/189.11
(58) Field of Search .................................. 327/536, 537; 365/185.18, 185.23, 189.11

(56) References Cited

U.S. PATENT DOCUMENTS

| | | | |
|---|---|---|---|
| 5,524,266 | * 6/1996 | Tedrow et al. | 395/800 |
| 5,644,534 | * 7/1997 | Soejima | 365/185.23 |
| 5,698,972 | * 12/1997 | Keeth | 323/349 |
| 5,880,622 | * 3/1999 | Evertt et al. | 327/535 |
| 5,939,935 | * 8/1999 | Merritt | 327/536 |
| 6,037,622 | * 3/2000 | Lin et al. | 257/299 |

OTHER PUBLICATIONS

A schematic representation of a circuit included at p. 15 of Fujitsu 64 Meg Sync DRAM.

* cited by examiner

*Primary Examiner*—Terry D. Cunningham
*Assistant Examiner*—Quan Tra
(74) *Attorney, Agent, or Firm*—Williams, Morgan & Amerson, P.C.

(57) ABSTRACT

A voltage pump circuit includes a voltage output line, first and second stages, and timing control logic. The first stage includes a first capacitor and a first switching device coupled to the first capacitor. The second stage includes a second capacitor coupled to the first switching device and a second switching device coupled between the second capacitor and the voltage output line. The timing control logic is adapted to charge the first capacitor, boot the first capacitor, enable the first switching device to transfer the charge in the first capacitor to the second capacitor, boot the second capacitor, and enable the second switching device to transfer the charge in the second capacitor to the voltage output line. A method for providing an output voltage at a level higher than an input voltage is provided. A first capacitor in a first stage of a voltage pump circuit is charged to the input voltage. The first capacitor is booted with the input voltage. The charge in the first capacitor is transferred to a second capacitor in a second stage of the voltage pump circuit. The second capacitor is booted with the input voltage. The charge in the second capacitor is transferred to a voltage output line.

47 Claims, 7 Drawing Sheets

TWO-STAGE VOLTAGE PUMP

BACKGROUND OF THE INVENTION

1. Field of the Invention

This invention relates generally to integrated circuits, and, more particularly, to a two-stage voltage pump for providing an internal voltage supply at a higher voltage magnitude than an external power supply voltage.

2. Description of the Related Art

System designs are routinely constrained by a limited number of readily available power supply voltages ($V_{cc}$). For example, consider a portable computer system powered by a conventional battery having a limited power supply voltage. For proper operation, different components of the system, such as display, processor, and memory components employ diverse technologies that require power to be supplied at various operating voltages. Components often require operating voltages of a greater magnitude than the power supply voltage and, in other cases, a voltage of reverse polarity. The design of a system, therefore, includes power conversion circuitry to efficiently develop the required operating voltages. One such power conversion circuit is known as a voltage pump. The demand for highly-efficient and reliable voltage pump circuits has increased with the increasing number of applications utilizing battery powered systems, such as notebook computers, portable telephones, security devices, battery-backed data storage devices, remote controls, instrumentation, and patient monitors, to name a few.

Inefficiencies in conventional voltage pumps lead to reduced system capability and lower system performance in both battery and non-battery operated systems. Inefficiency can adversely affect system capabilities, e.g., limited battery life, excess heat generation, and high operating costs. Samples of lower system performance include low speed operation, excessive operating delays, loss of data, limited communication range, and inability to operate over wide variations in ambient conditions including ambient light level and temperature.

In addition to constraints on the number of power supply voltages available for system design, there is an increasing demand for reducing magnitudes of the power supply voltages. Current voltage pump circuits have difficulty providing sufficiently high output voltages as the supply voltage approaches two volts.

Figure 1:
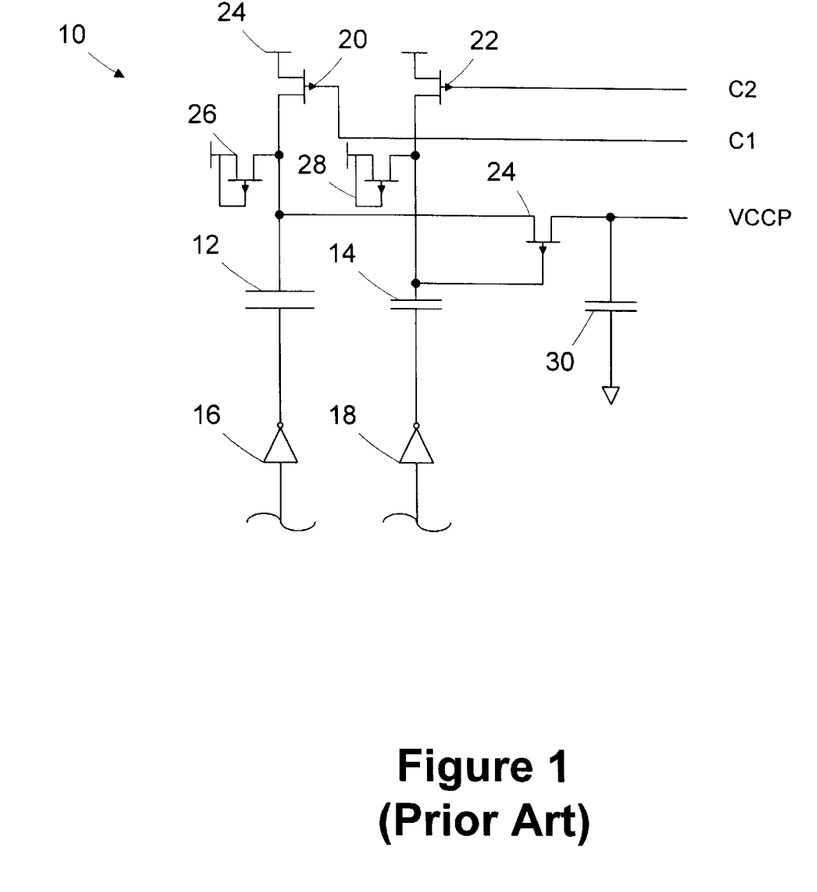
FIG. 1 is a circuit diagram of a prior art voltage pump circuit.

An exemplary prior art voltage pump circuit 10 is shown in FIG. 1. Only one of the two complimentary phases is shown. The other phase is symmetrical to the phase shown in the voltage pump circuit 10. Typically, an oscillator signal is used to generate non-overlapping complimentary enable signals for alternately firing each phase. The voltage pump circuit 10 includes capacitors 12, 14. During a charging phase, the output signals of inverters 16, 18 are held at a low voltage level. The charging phase of one phase corresponds to the firing phase of the other phase. During the charging phase, control signals C1, C2 enable the gates of transistors 20, 22, coupling the capacitors 12, 14 to a voltage supply 24 (Vdd) and charging them to a voltage of Vdd. The control signals C1, C2 are generated from the firing signals of the other phase.

During the firing phase, the transistors 20, 22 are disabled, and the inverters 16, 18 are driven to a high output voltage (ie., booted), thus raising the voltage on the capacitors 12, 14 to ~2*Vdd. The inverter 18 is enabled slightly after the inverter 16 to allow the capacitor 12 to fully boot. After the inverter 18 is enabled, the voltage present on the capacitor 14 enables a pass gate 24, which connects the capacitor 12 to the output voltage line, Vccp, and the capacitor delivers its charge. Clamping transistors 26, 28 keep the voltage on the capacitors 12, 14 from falling below a threshold drop, Vt, under Vdd during the charging phase to increase circuit efficiency. A filtering capacitor 30 is coupled to the Vccp output terminal. The voltage pump circuit 10 has an unregulated output voltage of about 3.5V (Vccp) with a 2V supply voltage (Vdd). This output voltage is insufficient for some integrated circuit applications.

The present invention is directed to overcoming, or at least reducing the effects of, one or more of the problems set forth above.

SUMMARY OF THE INVENTION

One aspect of the present invention is seen in a voltage pump circuit including a voltage output line, first and second stages, and timing control logic. The first stage includes a first capacitor and a first switching device coupled to the first capacitor. The second stage includes a second capacitor coupled to the first switching device and a second switching device coupled between the second capacitor and the voltage output line. The timing control logic is adapted to charge the first capacitor, boot the first capacitor, enable the first switching device to transfer the charge in the first capacitor to the second capacitor, boot the second capacitor, and enable the second switching device to transfer the charge in the second capacitor to the voltage output line.

Another aspect of the present invention is seen in a method for providing an output voltage at a level higher than an input voltage. A first capacitor in a first stage of a voltage pump circuit is charged to the input voltage. The first capacitor is booted with the input voltage. The charge in the first capacitor is transferred to a second capacitor in a second stage of the voltage pump circuit. The second capacitor is booted with the input voltage. The charge in the second capacitor is transferred to a voltage output line.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
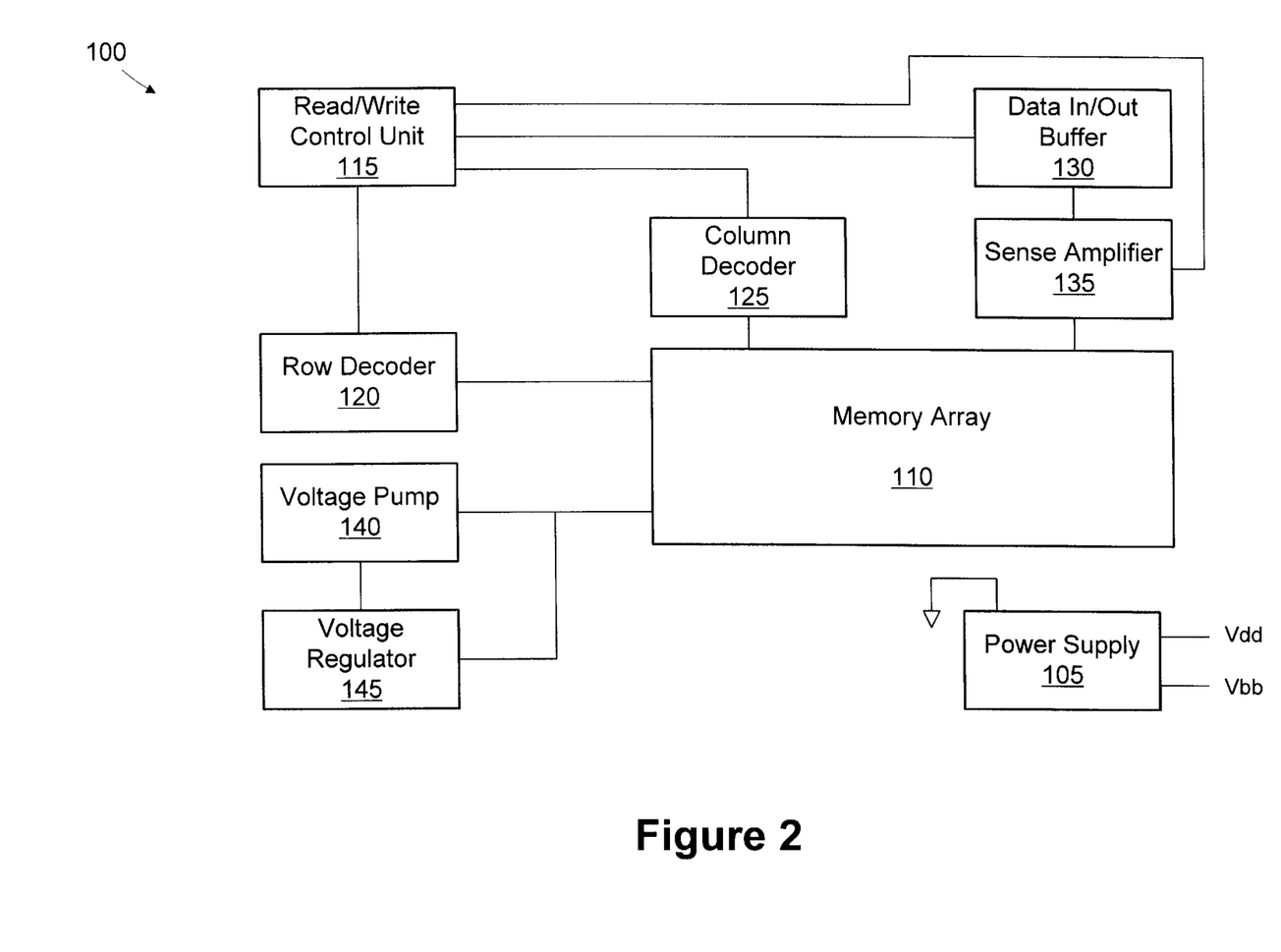
FIG. 2 is a simplified block diagram of a memory device in accordance with the present invention.

Referring to FIG. 2, a block diagram of a memory device 100 in accordance with the present invention is provided. The memory device 100 includes a conventional power supply 105 that provides regulated power signals to a memory array 110 and related memory access circuits. The power signals include Vdd (the primary operating voltage for the semiconductor circuit) and Vbb (the voltage level to which the substrate voltage is regulated). The memory array 110 consists of a number of individual memory cells or transistors organized in rows and columns. Each memory cell can hold one of two states, corresponding to binary zero and binary one. For a data access (read or write) operation to be performed upon a particular memory cell within the array, a read/write control circuit 115 provides the row address of the cell to a row decoder 120 and the column address of the cell to a column decoder 125. A data in/out buffer 130 provides an interface for the data between the selected memory cell and external data (input/output) ports (not shown), which are coupled to the buffer 130. Sense amplifiers 135, which are directed by the read/write control circuit 115, are used to convert the information provided by the selected memory cell to the appropriate voltage level for the data in/out buffer 130. Control over the timing and direction of data flow is provided by the read/write control circuit 115. Each of the above circuits is well known in the art, and for clarity and ease of illustration, they are not described in greater detail herein.

To support accurate and fast access to the selected memory cells, a stable high-level "Vccp" voltage is provided to the memory array 110 at a voltage level that is greater than Vdd. In the illustrated embodiment, the voltage for Vdd may be set to about 2.0 volts, thereby requiring Vccp to be set so as to safely operate more than one diode drop higher than Vdd. With Vdd set at 2.0 volts, the desired Vccp is about 4.0 volts. A voltage pump circuit 140 and a differential voltage regulator 145 are adapted to provide Vccp at such a regulated level. An exemplary differential voltage regulator 145 is described in U.S. Pat. No. 5,698,972, and is incorporated by reference herein in its entirety.

Figure 3:
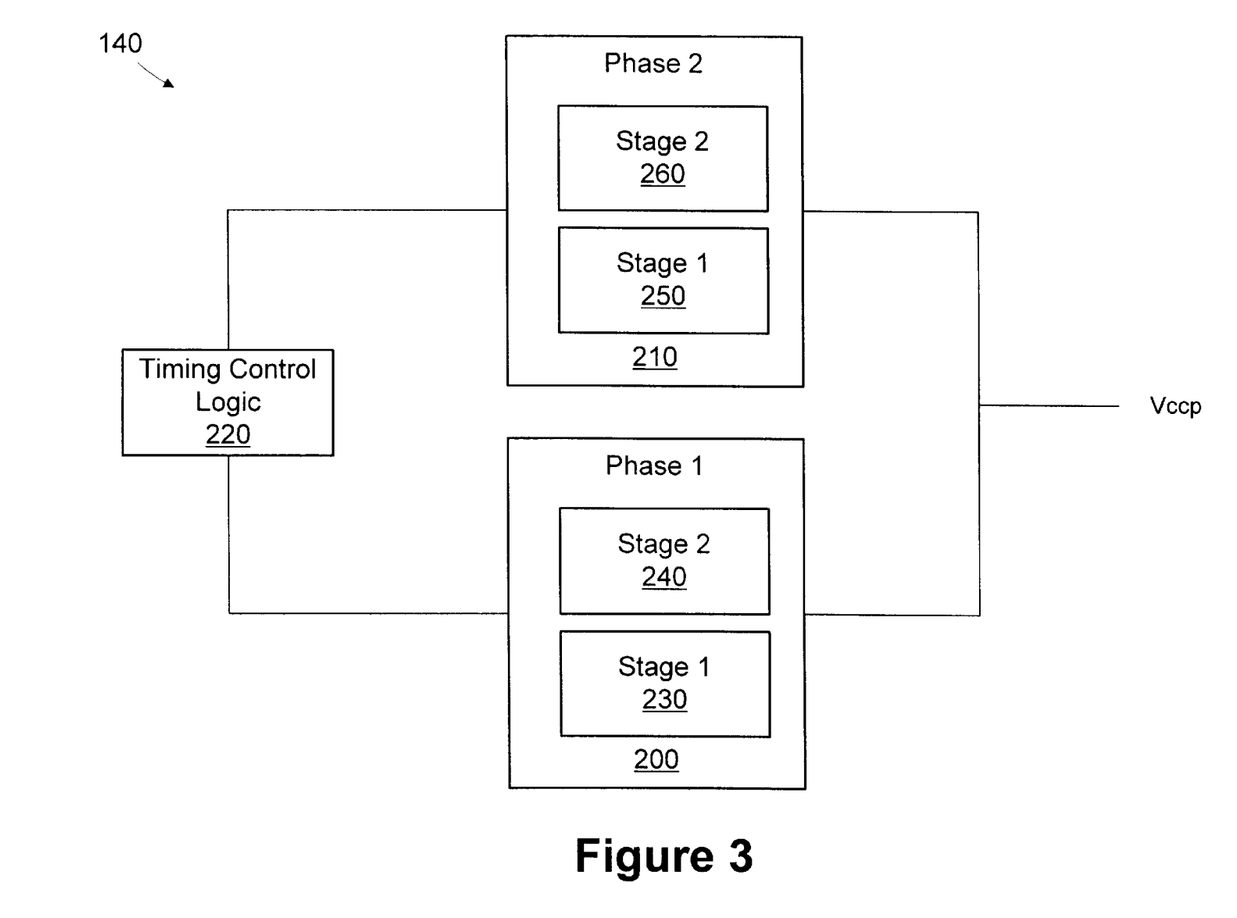
FIG. 3 is a simplified block diagram of a voltage pump circuit in the memory device of FIG. 2.

Turning now to FIG. 3, a simplified block diagram of the voltage pump circuit 140 is shown. The voltage pump circuit 140 includes first and second phases 200, 210 controlled by timing control logic 220 to alternately charge and fire to generate the output voltage, Vccp. Each phase 200, 210 includes first and second stages, 230 and 240 for the first phase 200, and 250 and 260 for the second phase 210. The phases 200, 210 are symmetrical. The operation of the first phase 200 is described in greater detail below. The operation of the second phase 210 is essentially the same with the exception of the complimentary timing required to alternate the phases 200, 210.

In the following circuit descriptions, unless otherwise noted, the supply voltage used to tie various transistors or elements to a high voltage level is at Vdd (e.g., ~2V). Also, as will be appreciated by those of ordinary skill in the art, equivalent logic or physical circuits may be developed using alternate logic elements (e.g., NAND vs. NOR logic). Various transistors described below are shown as either N-type or P-Type devices, although it is contemplated that the complementary type may be used with appropriate logic changes. Also, exemplary capacitance values are given for various capacitors described below. It will be appreciated by one of ordinary skill in the art that these capacitance values may be varied to tune the circuits in which they are contained.

Figure 4:
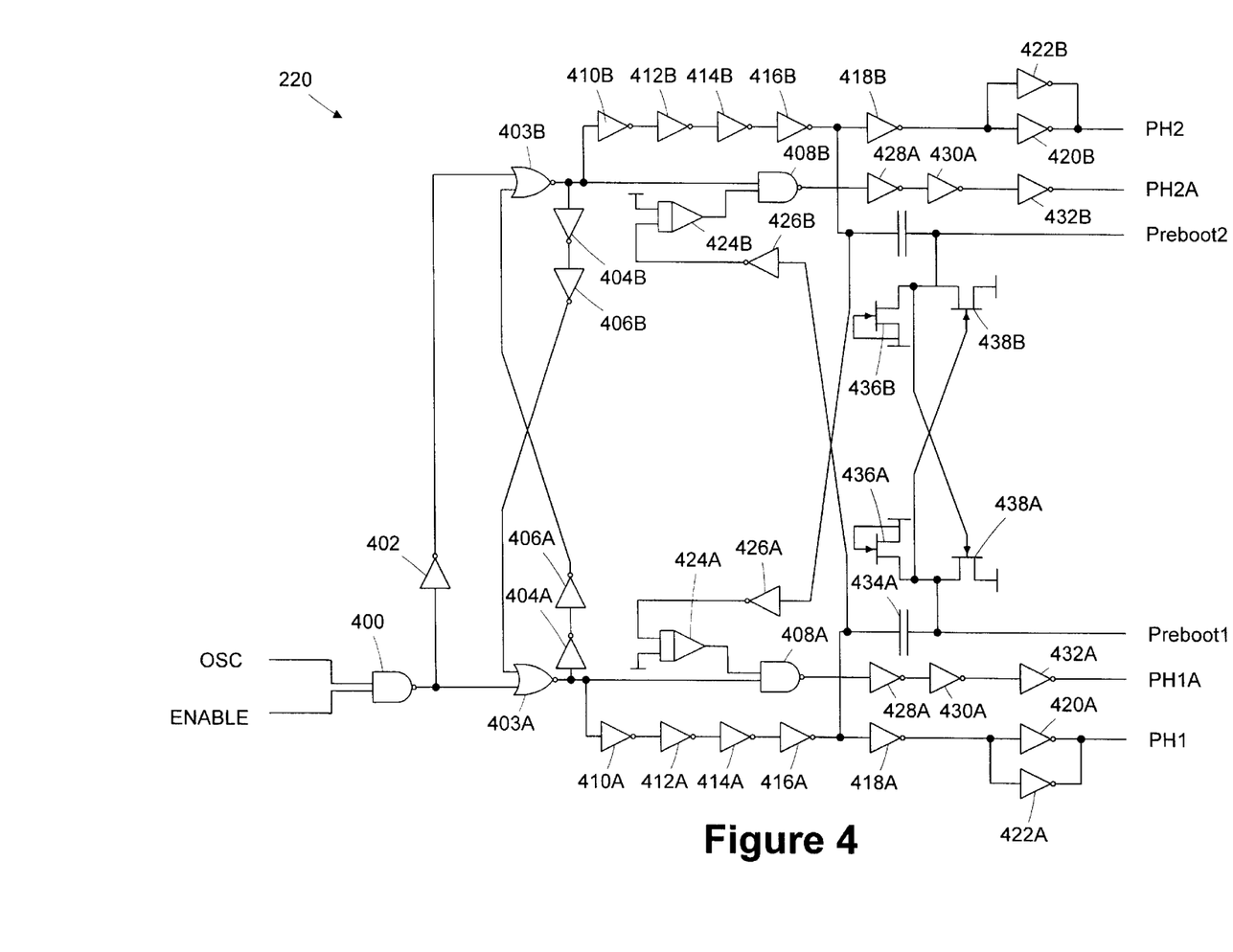
FIG. 4 is a circuit diagram of timing control logic in the voltage pump circuit of FIG. 3.

FIG. 4 shows a circuit diagram of the timing control logic 220. The main purpose of the timing control logic 220 is to provide non-overlapping timing signals for charging and firing the phases 200, 210 of the voltage pump circuit 140. The timing control logic 220 is symmetric. For ease of illustration, the elements associated with the timing signals for the first phase 200 are discussed. Elements associated with the first phase 200 are designated by an "A" in their reference numerals, and elements associated with the second phase 210 are designated by a "B" in their reference numerals.

An alternating oscillator signal (OSC) and an enable signal are received as input signals to a NAND gate 400. In the illustrated embodiment, the frequency of the oscillator signal is about 48 MHz. The frequency is selected such that each phase 200, 210 may completely discharge before activation of the other phase 200, 210. The output of the NAND gate 400 provides a timing signal for the first phase 200. The NAND Gate 400 is also coupled to an inverter 402, the output of which provides a timing signal for the second phase 210. The NAND Gate 400 is also coupled to a NOR gate 403A. The output of the NOR gate 403A is coupled through a pair of delay inverters 404A, 406A to the corresponding NOR gate 403B for the second phase 210, and the input of the NOR gate 403B receives the output of the corresponding inverter 406B. The NOR gates 403A, 403B are cross-coupled so that the output of one must be low for the other to go high (i.e., non-overlapping).

The NOR gate 403A is coupled to a NAND gate 408A, and to a delay chain including inverters 410A, 412A, 414A, 416A, and 418A. The inverter 418 is coupled to a pair of inverters 420A, 422A. The inverters 420A, 422A, are connected in parallel to provide an increased output current for driving a PH1 signal used by the first phase 200.

The NAND gate 408A also receives the output of a delay element 424A as an input. The input of the delay element 424A is coupled through an inverter 426A to the output of the inverter 416B (i.e., to prevent overlapping). The output of the NAND gate 408A is coupled to inverters 428A, 430A, 432A fir driving a PH1A signal used by the first phase 200. The delay provided by the delay element 424A is about 2 ns. Accordingly, the PH1A signal lags the PH1 signal by about 2 ns.

The output of the inverter 416A is also coupled to a capacitor 434A for driving a Preboot1 signal. A clamping transistor 436A is coupled to the output of the capacitor 434A to increase efficiency by preventing the voltage on the capacitor 434A from dropping more than a threshold drop below Vdd when the capacitor 434A is not being booted. A transistor 438A is cross-coupled to the output of the capacitor 434B of the timing logic for the second phase 210 to charge the capacitor 434A to Vdd before booting. In the illustrated embodiment, the capacitor 434A has a capacitance of about 2.2 pf.

As used herein, the term "booting" refers to driving the negative plate of a charged capacitor to a predetermined voltage level to thereby increase the apparent voltage on the positive plate of the capacitor to substantially that of the predetermined voltage plus the voltage already present on the charged capacitor.

Figure 5:
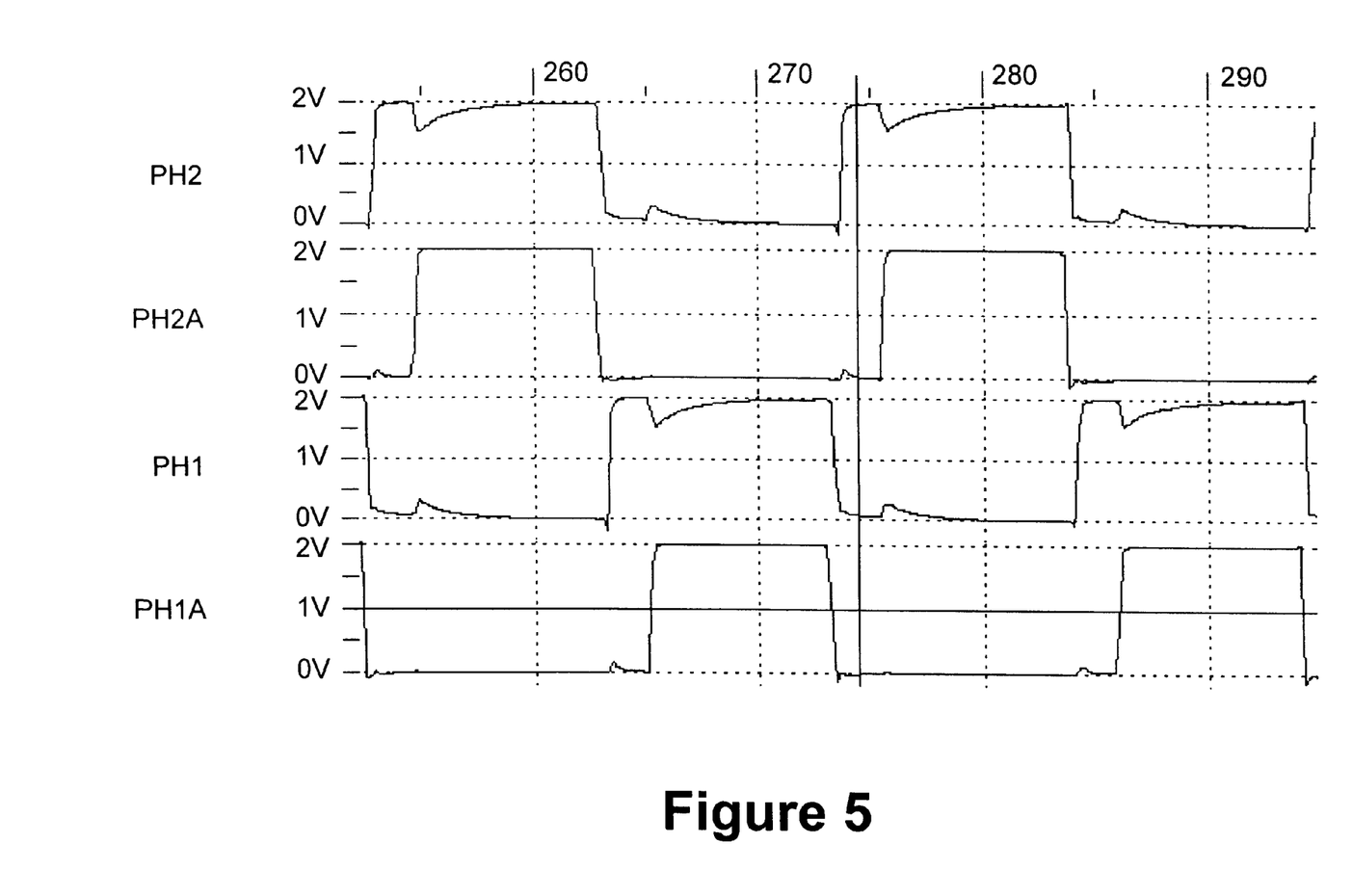
FIG. 5 is a timing diagram illustrating timing signals generated by the timing control logic if FIG. 4.

Turning briefly to FIG. 5, a timing diagram of the PH1, PH1A, PH2, and PH2A signals is provided. Notice that the signals for the respective phases 200, 210 do not overlap. Also, the PH1A and PH2A signals lag their respective PH1 and PH2 signals by about 2 ns.

Figure 6:
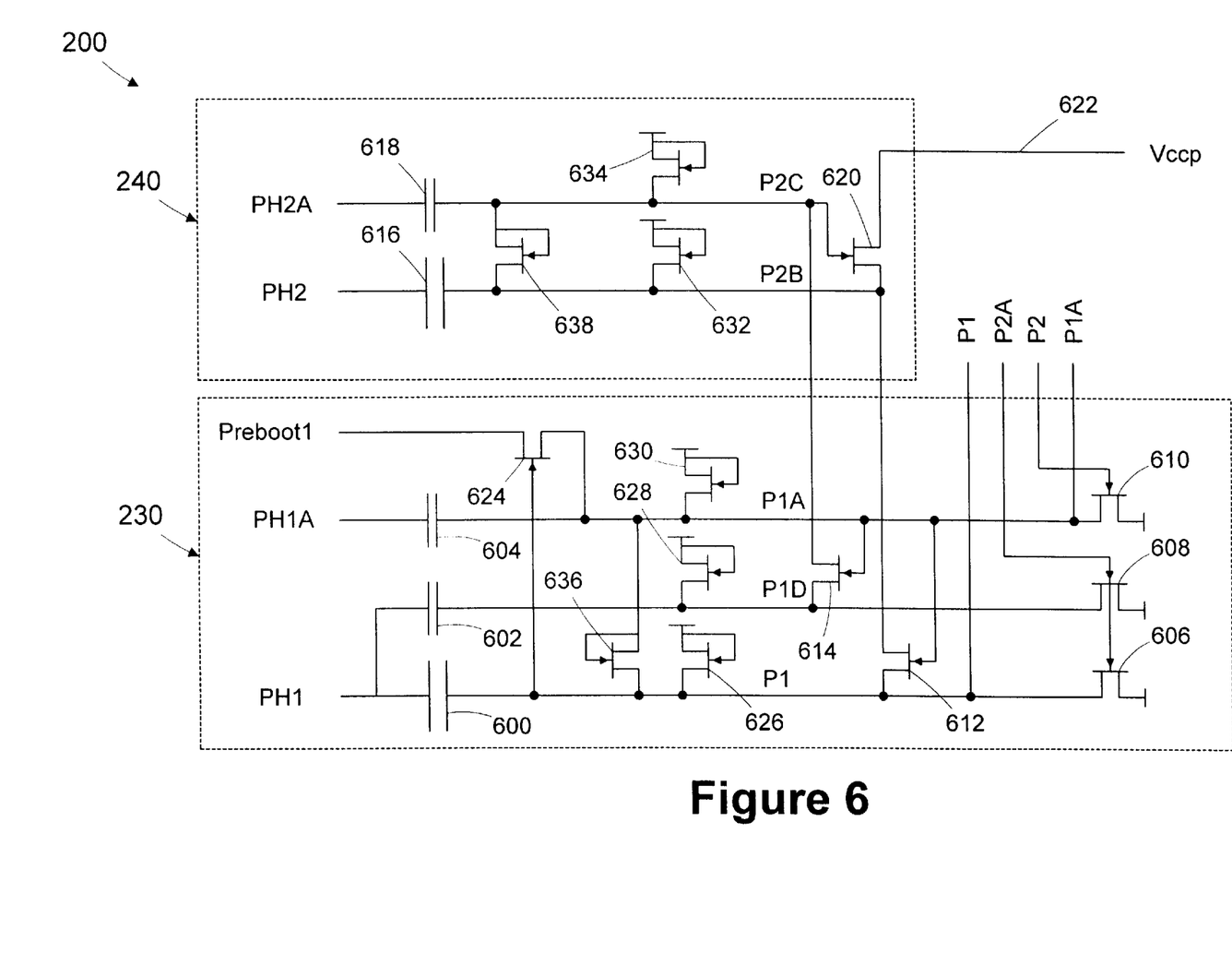
FIG. 6 is a circuit diagram of one phase of the voltage pump circuit of FIG. 3.

Referring now to FIG. 6, a circuit diagram of the first phase 200 of the voltage pump circuit 140 is shown. The first and second phases 200, 210 are symmetrical, thus only the first phase 200 is described herein so as to not unnecessarily obscure the instant invention. The first phase 200 includes first and second stages 230, 240. While the first stage 230 is charging, the second stage 240 is discharging, and vice versa.

The first stage 230 includes charge sharing capacitors 600, 602, and a gate capacitor 604. The capacitors 600, 602, 604 are charged through transistors 606, 608, 610, respectively, during the charging phase of the first stage 230 (i.e., PH1 and PH1A are held low by the timing control logic 220). In the illustrated embodiment, the capacitor 600 has a capacitance of about 33 pf, and the capacitors 602, 604 have a capacitance of about 1 pf. The enable signals, P2, P2A, for the transistors 606, 608, 610 are provided by the symmetrical second phase 210. The P1 and P1A signals are used to enable the like charging transistors (not shown) in the second phase 210.

After the capacitors 600, 602, 604 are charged, the P2 and P2A signals are deasserted, and the PH1 and PH1A signals are asserted by the timing control logic 220 to boot the capacitors 600, 602, 604, essentially doubling the apparent voltages on the capacitors 602, 604 to 2*Vdd. Because the PH1A signal lags the PH1 signal, the charge sharing capacitors 600, 602 are fully booted before the gate capacitor 604 is booted. The gate capacitor 604 enables pass gates 612, 614 to allow the charge in the charge sharing capacitors 600, 602 to transfer into capacitors 616, 618 in the second stage 240, respectively. During the charge transfer, the PH2 and PH2A signals are deasserted by the timing control logic 220. In the illustrated embodiment, the capacitor 616 has a capacitance of about 33 pf, and the capacitors 618 has a capacitance of about 1 pf.

Following the charge transfer, the PH2 and PH2A signals are asserted by the timing control logic 220 to boot the capacitors 616, 618, and thus, further raise the apparent voltage on the capacitors 616, 618. After the PH2A signal is asserted, the voltage on the capacitor 618 enables a pass gate 620, which allows the charge on the capacitor 610 to transfer to a Vccp output line 622. The first and second phases 200, 210 alternately transfer charge to the Vccp output line 622 during operation.

The capacitor 600 is coupled to a transistor 624 to allow prebooting of the capacitor 604 by the Preboot1 signal from the timing control logic 220. Prebooting the capacitor 604 increases the voltage available for enabling the pass gates 612, 614, thus increasing speed and efficiency of the charge transfer. Clamping transistors 626, 628, 630, 632, 634 are provided to prevent the voltages on the capacitors 600, 602, 604, 616, 618, respectively, from falling more than a diode drop below Vdd when they are unbooted and starting to charge. A clamping transistor 636 allows excess charge on the capacitor 604 to transfer to the capacitor 600 during discharged periods to increase circuit efficiency. Likewise, a clamping transistor allows such transfer between the capacitors 616, 618.

Figure 7:
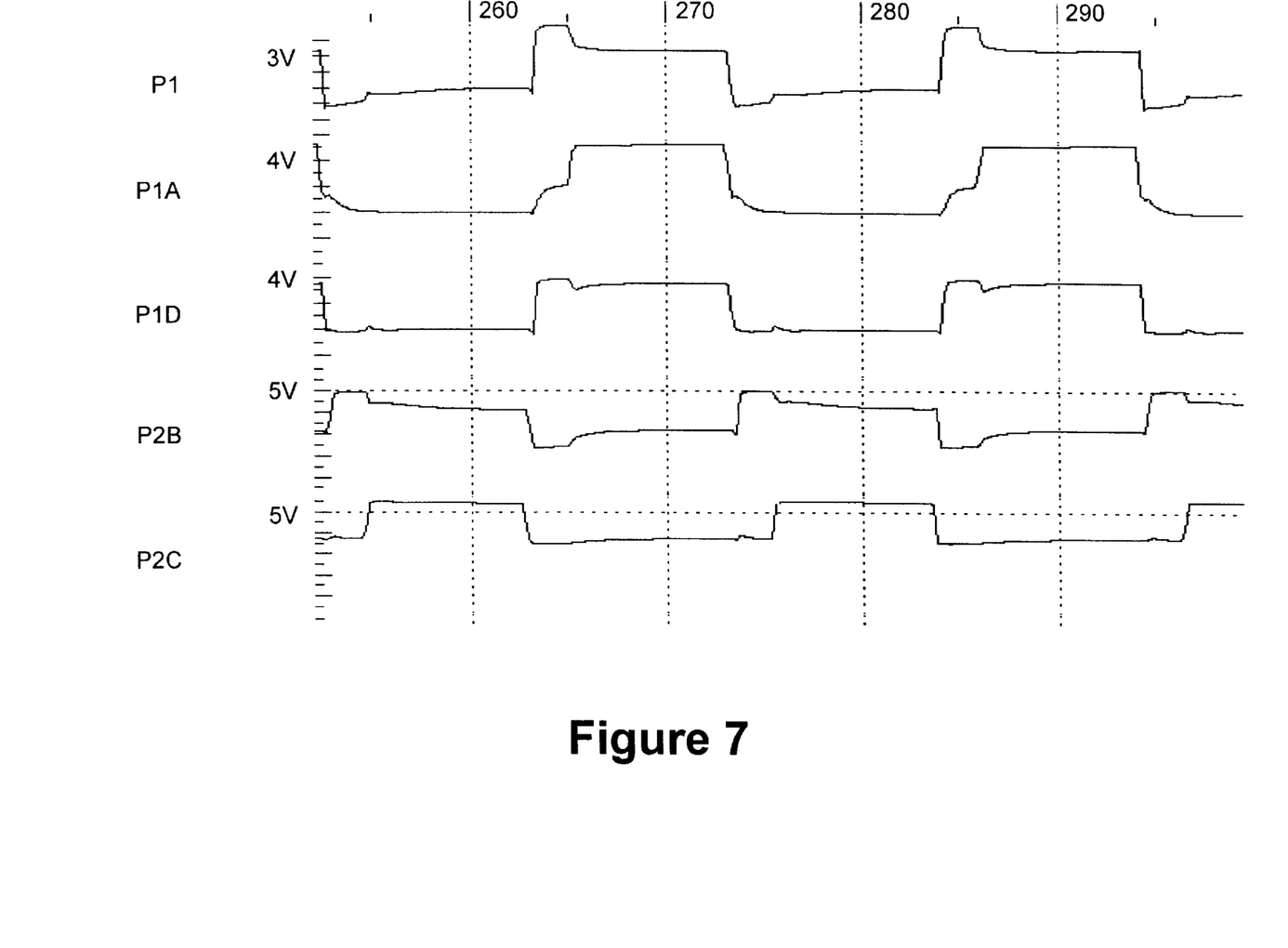
FIG. 7 is a timing diagram illustrating signals at various points in the phase circuit of FIG. 6.

FIG. 7 illustrates a timing diagram of the signals P1, P1A, P1D, P2B, and P2C generated by the first phase 200. The signals provided on FIGS. 5 and 7 were captured during the initial ramp up of the voltage pump circuit 140.

The unregulated maximum voltage achieved by the voltage pump circuit 140 is about 4.5 volts with Vdd at about 2 volts. The prior art voltage pump circuit 10 described in FIG. 1 has an unregulated maximum voltage of about 3.5 volts. The voltage pump circuit 140 of the present invention allows greater flexibility due to its increased output range. In practice, the voltage regulator 145 of FIG. 1 typically regulates Vccp at a voltage less than the maximum (e.g., 4.0 volts) to supply the memory array 110.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A voltage pump circuit, comprising:
    a voltage output line;
    a first stage, including:
        a first capacitor coupled to a first switching device having a gate input;
        a second capacitor coupled to a second switching device having a gate input; and
        a first gate capacitor coupled to the gate inputs of the first and second switching devices
    a second stage including:
        a third capacitor coupled to the first switching device;
        a third switching device having a gate input and being coupled between the third capacitor and the voltage output line; and
        a second gate capacitor coupled to the gate input of the third switching device; and
    timing control logic adapted to charge the first capacitor, the second capacitor, and the first gate capacitor, boot the first and second capacitors, boot the first gate capacitor to enable the first and second first switching devices to transfer at least a portion of the charges in the first and second capacitors to the third capacitor and the second gate capacitor, respectively, and boot the second gate capacitor to enable the third switching device to transfer the charge in the second capacitor to the voltage output line.

2. The voltage pump circuit of claim 1, wherein the timing control logic is adapted to charge the first gate capacitor while charging the first capacitor.

3. The voltage pump circuit of claim 2, wherein the timing control logic is adapted to boot the first gate capacitor a predetermined time interval after booting the first capacitor.

4. The voltage pump circuit of claim 3, wherein the predetermined time interval is about 2 ns.

5. The voltage pump circuit of claim 3, wherein the timing control logic is adapted to pre-boot the first gate capacitor.

6. The voltage pump circuit of claim 1, wherein the timing control logic is adapted to boot the second gate capacitor a predetermined time interval after booting the third capacitor.

7. The voltage pump circuit of claim 6, wherein the predetermined time interval is about 2 ns.

8. The voltage pump circuit of claim 1, wherein the timing control logic is adapted to charge the second capacitor while charging the first capacitor.

9. The voltage pump circuit of claim 1, wherein the first, second, and third switching devices comprise transistors.

10. A voltage pump circuit, comprising:
   a voltage output line;
   a first stage, including:
      a first capacitor coupled to a coupled to a first charging transistor, the first charging transistor having an enable input responsive to a first charging signal;
      a second capacitor coupled to a second charging transistor, the second charging transistor having an enable input responsive to the first charging signal;
      a first pass gate coupled to the first capacitor, the first pass gate having an enable input responsive to a first transfer signal;
      a second pass gate coupled to the second capacitor, the second pass gate having an enable input responsive to the first transfer signal;
      a first gate capacitor coupled to enable inputs of the first and second pass gates;
   a second stage including:
      a third capacitor coupled to the first pass gate;
      a third pass gate coupled between the third capacitor and the voltage output line, the third pass gate having an enable input responsive to a second transfer signal; and
      a second gate capacitor coupled to the second capacitor and the enable input of the third pass gate; and
   timing control logic adapted to provide the first charging signal, boot the first and second capacitors, boot the first gate capacitor to generate the first transfer signal, boot the third capacitor, and boot the second gate capacitor to generate the second transfer signal.

11. The voltage pump circuit of claim 10, wherein the timing control logic is adapted to boot the first gate capacitor a predetermined time interval after booting the first capacitor.

12. The voltage pump circuit of claim 11, wherein the predetermined time interval is about 2 ns.

13. The voltage pump circuit of claim 11, wherein the timing control logic is adapted to pre-boot the first gate capacitor.

14. The voltage pump circuit of claim 10, wherein the timing control logic is adapted to boot the second gate capacitor a predetermined time interval after booting the third capacitor.

15. The voltage pump circuit of claim 14, wherein the predetermined time interval is about 2 ns.

16. The voltage pump circuit of claim 10, wherein the timing control logic is adapted to boot the second capacitor while booting the first capacitor to transfer charge stored in the second capacitor to the second gate capacitor.

17. A memory device, comprising:
   an array of storage cells for storing data for the memory device;
   an address circuit coupled to the array that selects a cell of the array to be accessed;
   a voltage pump coupled to the array that provides a regulated output voltage signal, the voltage pump circuit comprising:
      a voltage output line;
      a first stage, including:
         a first capacitor coupled to a first switching device having a gate input;
         a second capacitor coupled to a second switching device having a gate input; and
         a first gate capacitor coupled to the gate inputs of the first and second switching devices
      a second stage including:
         a third capacitor coupled to the first switching device;
         a third switching device having a gate input and being coupled between the third capacitor and the voltage output line; and
         a second gate capacitor coupled to the gate input of the third switching device; and
            timing control logic adapted to charge the first capacitor, the second capacitor, and the first gate capacitor, boot the first and second capacitors, boot the first gate capacitor to enable the first and second first switching devices to transfer at least a portion of the charges in the first and second capacitors to the third capacitor and the second gate capacitor, respectively, and boot the second gate capacitor to enable the third switching device to transfer the charge in the second capacitor to the voltage output line; and
   a voltage regulator coupled to the voltage pump and providing an output voltage signal that regulates the voltage pump circuit to maintain a first voltage level with respect to a second, different voltage.

18. The memory device of claim 17, wherein the timing control logic is adapted to charge the first gate capacitor while charging the first capacitor.

19. The memory device of claim 18, wherein the timing control logic is adapted to boot the first gate capacitor a predetermined time interval after booting the first capacitor.

20. The memory device of claim 19, wherein the predetermined time interval is about 2 ns.

21. The memory device of claim 18, wherein the timing control logic is adapted to pre-boot the first gate capacitor.

22. The memory device of claim 17, wherein the timing control logic is adapted to boot the second gate capacitor a predetermined time interval after booting the third capacitor.

23. The memory device of claim 22, wherein the predetermined time interval is about 2 ns.

24. The memory device of claim 17, wherein the timing control logic is adapted to charge the second capacitor while charging the first capacitor.

25. The memory device of claim 17, wherein the first, second, and third switching devices comprise transistors.

26. A method for providing an output voltage at a level higher than an input voltage, comprising:
   charging a first capacitor in a first stage of a voltage pump circuit to the input voltage;
   charging a second capacitor in a first stage of a voltage pump circuit to the input voltage;
   booting the first and second capacitors with the input voltage;
   transferring the charge in the first capacitor to a third capacitor in a second stage of the voltage pump circuit;

transferring the charge in the second capacitor to a fourth capacitor in a second stage of the voltage pump circuit;

booting the third capacitor with the input voltage; and booting the fourth capacitor to transfer charge in the second capacitor to a voltage output line.

27. The method of claim 26, wherein charging the first and second capacitors includes:

generating a first charging signal; and enabling charging transistors coupled to the first and second capacitors based on the first charging signal.

28. The method of claim 26, wherein transferring the charge in the first capacitor includes:

generating a transfer signal; and enabling a pass gate coupled between the first capacitor and the third capacitor based on the transfer signal.

29. The method of claim 28, wherein transferring the charge in the second capacitor includes enabling a pass gate coupled between the second capacitor and the fourth capacitor based on the transfer signal.

30. The method of claim 28, wherein generating the transfer signal includes:

charging a fifth capacitor in the first stage; and booting the fifth capacitor with the input voltage to generate the transfer signal.

31. The method of claim 30, wherein booting the fifth capacitor includes booting the fifth capacitor a predetermined time interval after booting the first capacitor.

32. The method of claim 31, wherein booting the fifth capacitor includes booting the fifth capacitor about 2 ns after booting the first capacitor.

33. The method of claim 30, further comprising prebooting the fifth capacitor.

34. The method of claim 26, wherein transferring the charge in the third capacitor includes:

generating a transfer signal; and enabling a pass gate coupled between the third capacitor and the voltage output line based on the transfer signal.

35. The method of claim 34, wherein generating the transfer signal includes booting the fourth capacitor with the input voltage.

36. A voltage pump circuit, comprising:

a voltage output line;

a first stage, including:

a first capacitor and a first switching device coupled to the first capacitor; and a first gate capacitor coupled to a gate input of the first switching device;

a second stage including a second capacitor coupled to the first switching device and a second switching device coupled between the second capacitor and the voltage output line; and timing control logic adapted to charge the first capacitor, charge the first gate capacitor while charging the first capacitor, boot the first capacitor, pre-boot the first gate capacitor, boot the first gate capacitor a predetermined time interval after booting the first capacitor to enable the first switching device to transfer the charge in the first capacitor to the second capacitor, boot the second capacitor, and enable the second switching device to transfer the charge in the second capacitor to the voltage output line.

37. The voltage pump circuit of claim 36, wherein the second stage includes a second gate capacitor coupled to a gate input of the second switching device, and the timing control logic is adapted to boot the second gate capacitor a predetermined time interval after booting the second capacitor.

38. The voltage pump circuit of claim 36, wherein the first and second switching devices comprise transistors.

39. A voltage pump circuit, comprising:

a voltage output line;

a first stage, including:

a first capacitor coupled to a charging transistor, the charging transistor being responsive to a first charging signal; and a first pass gate coupled to the first capacitor, the first pass gate being responsive to a first transfer signal;

a first gate capacitor coupled to the charging transistor and coupled to a gate input of the first pass gate a second stage, including:

a second capacitor coupled to the first pass gate; and a second pass gate coupled between the second capacitor and the voltage output line, the second pass gate being responsive to a second transfer signal; and timing control logic being adapted to provide the first charging signal, boot the first capacitor, pre-boot the first gate capacitor, boot the first gate capacitor to generate the first transfer signal a predetermined time interval after booting the first capacitor, boot the second capacitor, and provide the second transfer signal.

40. The voltage pump circuit of claim 39, wherein the second stage includes a second gate capacitor coupled to a gate input of the second pass gate, and the timing control logic is adapted to boot the second gate capacitor a predetermined time interval after booting the second capacitor to generate the second transfer signal.

41. A memory device, comprising:

an array of storage cells for storing data for the memory device;

an address circuit coupled to the array that selects a cell of the array to be accessed;

a voltage pump coupled to the array that provides a regulated output voltage signal, the voltage pump circuit comprising:

a voltage output line;

a first stage, including:

a first capacitor;

a first switching device coupled to the first capacitor; and a first gate capacitor coupled to a gate input of the first switching device a second stage including a second capacitor coupled to the first switching device and a second switching device coupled between the second capacitor and the voltage output line; and timing control logic adapted to charge the first capacitor, boot the first capacitor, charge the first gate capacitor while charging the first capacitor, pre-boot the first gate capacitor, boot the first gate capacitor a predetermined time interval after booting the first capacitor to enable the first switching device to transfer the charge in the first capacitor to the second capacitor, boot the second capacitor, and enable the second switching device to transfer the charge in the second capacitor to the voltage output line; and a voltage regulator coupled to the voltage pump and providing an output voltage signal that regulates the voltage pump circuit to maintain a first voltage level with respect to a second, different voltage.

42. The memory device of claim 41, wherein the second stage includes a second gate capacitor coupled to a gate input of the second switching device, and the timing control logic is adapted to boot the second gate capacitor a predetermined time interval after booting the second capacitor.

43. The memory device of claim 41, wherein the first and second switching devices comprise transistors.

44. A method for providing an output voltage at a level higher than an input voltage, comprising:

charging a first capacitor in a first stage of a voltage pump circuit to the input voltage;

charging a first gate capacitor in a first stage of the voltage pump circuit to the input voltage while charging the first capacitor;

pre-booting the first gate capacitor with the input voltage;

booting the first capacitor with the input voltage;

booting the first gate capacitor a predetermined time interval after booting the first capacitor;

transferring the charge in the first capacitor to a second capacitor in a second stage of the voltage pump circuit;

booting the second capacitor with the input voltage; and transferring the charge in the second capacitor to a voltage output line.

45. The method of claim 44, wherein charging the first capacitor includes:

generating a first charging signal; and enabling a charging transistor coupled to the first capacitor based on the first charging signal.

46. The method of claim 44, wherein transferring the charge in the second capacitor includes:

generating a transfer signal; and enabling a pass gate coupled between the second capacitor and the voltage output line based on the transfer signal.

47. The method of claim 44, wherein generating the transfer signal includes:

charging a second gate capacitor in the second stage; and booting the second gate capacitor with the input voltage to generate the transfer signal.

* * * * *